US011893225B2

(12) United States Patent
    Dai

(10) Patent No.: US 11,893,225 B2
(45) Date of Patent: *Feb. 6, 2024

(54) HOST TO CLIENT DRAG-AND-DROP OPERATION

(71) Applicant: Citrix Systems, Inc., Ft. Lauderdale, FL (US)

(72) Inventor: Qing Dai, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,786

(22) Filed: Sep. 16, 2022

(65) Prior Publication Data

US 2023/0021156 A1    Jan. 19, 2023

Related U.S. Application Data

(63) Continuation of application No. 17/448,084, filed on Sep. 20, 2021, now Pat. No. 11,449,213.

(60) Provisional application No. 63/154,359, filed on Feb. 26, 2021.

(51) Int. Cl.
    *G06F 3/0486* (2013.01)
    *G06F 9/451* (2018.01)
    *G06F 3/0481* (2022.01)

(52) U.S. Cl.
    CPC .......... *G06F 3/0486* (2013.01); *G06F 3/0481* (2013.01); *G06F 9/452* (2018.02)

(58) Field of Classification Search
    CPC ...... G06F 3/0486; G06F 3/0481; G06F 9/452; G06F 3/048
    See application file for complete search history.

(56) References Cited

U.S. PATENT DOCUMENTS

| 6,211,879 B1* | 4/2001 | Soohoo ................. G06F 3/0485 715/854 |
| 7,783,985 B2 | 8/2010 | Indiran et al. |
| 8,190,707 B2 | 5/2012 | Trivedi et al. |
| 8,612,546 B2 | 12/2013 | Trivedi et al. |
| 2006/0288306 A1* | 12/2006 | Mahajan ................. G06F 9/452 709/224 |
| 2009/0058804 A1* | 3/2009 | Nagao ..................... G06F 3/038 345/157 |
| 2015/0220242 A1* | 8/2015 | Guest .................... G06F 3/0354 715/740 |
| 2015/0309694 A1* | 10/2015 | Nagao ................... G06F 3/0481 715/740 |
| 2019/0073109 A1* | 3/2019 | Zhang ..................... G06F 3/013 |
| 2020/0192539 A1* | 6/2020 | Li ........................ G06F 3/04845 |
| 2021/0397464 A1* | 12/2021 | Lv ......................... G06F 3/0481 |

* cited by examiner

Primary Examiner — Jeanette J Parker

(57) ABSTRACT

A computer system is provided. The computer system includes a memory, a user interface, and a processor coupled to the memory and the user interface. The at least one processor is configured to render, via the user interface, a first representation of the computer system and a second representation of a remote computer system distinct from the computer system; receive, via the user interface, input initiating a drag-and-drop operation of a digital resource provided by the remote computer system; detect entry of a cursor effectuating the drag-and-drop operation into the first representation; confine the cursor to a portion of the first representation; move a target proxy window to encompass the portion of the first representation; and free the cursor to continue effectuation of the drag-and-drop operation.

20 Claims, 9 Drawing Sheets

HOST TO CLIENT DRAG-AND-DROP OPERATION

CROSS REFERENCE TO RELATED APPLICATIONS

This application is a continuation of U.S. patent application Ser. No. 17/448,084 (filed 20 Sep. 2021), which claims the benefit of U.S. Provisional Patent Application 63/154,359 (filed 26 Feb. 2021). The entire disclosure of both of these priority applications is hereby incorporated herein by reference.

BACKGROUND

Drag-and-drop is a fast and intuitive way to transfer data on a computing device. When a user invokes a clipboard to transfer data, a user must perform a number of steps. For example, the user selects the data to be transferred; invokes a cut or copy command; moves to the desired destination; places the cursor at the desired location; and invokes a paste command. However, when the user invokes a drag-and-drop operation to transfer data, two steps can be removed from this process. For example, the user selects the data to be transferred by clicking it using a mouse button; drags the selection to the desired destination; and drops the selection by releasing the mouse button. This eliminates the need for menus, requires fewer user inputs, and often can be implemented faster than the clipboard-based sequence.

SUMMARY

Graphical user interfaces (GUIs) enable users to request execution of a variety of useful processes using drag-and-drop (DnD) operations. These processes can include creating new copies of files within a file system, moving existing files from one location to another within the file system, and specifying files as input to application programs, to name a few. Many operating systems (OSs) provide default frameworks in support of DnD operations. Some OSs allow application developers to augment these default frameworks to further enhance DnD operations as applied to specific application programs.

DnD operations executed under the control of a single OS tend to work satisfactorily. However, DnD operations that involve multiple OSs can suffer from inconsistent performance. For example, consider a GUI implemented by a client OS that allows a user to interact with the client OS and a host OS (for example, Microsoft Windows®, Linux®, or macOS®) via multiple windows. Within this context, the client OS can have difficulty detecting and initiating DnD operations between windows because some elements within the windows represent processes and/or data not under control of the client OS. There are a number of reasons for this. First, a host-to-client DnD operation involves an engaged mouse (that is, a mouse with the button held down) leaving a workspace application boundary while remaining engaged, which can be considered a nonstandard operation that in some circumstances may be disallowed. Second, an engaged mouse leaving a workspace boundary is not, in itself, a reliable indicator that a host-to-client DnD operation is underway. For example, if no item is selected at the beginning of the operation, movement of an engaged mouse should serve to select a rectangular area on the desktop or application, with no DnD operation initiated on server or client. As noted above, in some applications the engaged mouse will be blocked from leaving the workspace application boundary altogether. And thirdly, rapid mouse movement from host to client often results in the client OS failing to detect the start of the DnD operation, thus leading to an unreliable user experience.

Thus, and in accordance with at least some examples disclosed herein, systems and processes are provided that improve detection and initiation of DnD operations involving multiple OSs by introducing processes that coordinate DnD operations between the OSs. For instance, in the case of a host to client DnD operation, the systems and processes described herein establish a drop target proxy within the GUI of the host OS and a drop source proxy within the GUI of the client OS. These proxies coordinate with one another to enable each OS to execute a routine DnD operation in support of an overall DnD operation that spans both OSs.

In one example, a method for invoking a host-to-client drag-and-drop operation is provided. The method comprises rendering, via a user interface, a first representation of a client computer system and a second representation of a remote computer system distinct from the client computer system. The method further comprises receiving, via the user interface, input initiating a drag-and-drop operation of a digital resource provided by the remote computer system. The method further comprises detecting that a cursor effectuating the drag-and-drop operation has left the second representation. The method further comprises confining the cursor to a portion of the first representation. The method further comprises moving a source proxy window to encompass the portion of the first representation. The method further comprises freeing the cursor. The method further comprises initiating the drag-and-drop operation on the first representation.

At least some examples of the method can include one or more of the following features. The cursor is freed in response to the source proxy window detecting a simulated mouse event. The cursor is confined using a ClipCursor function of an operating system executing at the client computer system. The method further comprises executing a client virtualization agent that includes a client drag-and-drop agent; and receiving, by the client drag-and-drop agent, from a host drag-and-drop agent instantiated at the remote computer system, an event; wherein the cursor is confined to the portion of the first representation in response to receiving the event from the host drag-and-drop agent. The cursor is freed in response to the source proxy window being positioned such that it encompasses a location of the cursor. The source proxy window is established while the cursor remains confined to the portion of the first representation.

In another example, a client computer system comprises a memory and at least one processor coupled to the memory. The at least one processor is configured to execute a client operating system that, when executed, renders a client user interface. The at least one processor is further configured to execute a digital workspace application that, when executed, renders a digital workspace user interface within the client user interface, wherein the digital workspace user interface includes a visual representation of a remote computer system, and wherein the remote computer system is distinct from the client computer system. The at least one processor is configured to receive input initiating a drag-and-drop operation on a digital resource provided by the remote computer system, wherein the drag-and-drop operation is effectuated by a movable cursor, and wherein the input initiating the drag-and-drop operation is received within the visual representation of the remote computer system. The at least one processor is configured to detect that the movable cursor has left the visual representation of the remote computer system. The at least one processor is configured to detect that the drag-and-drop operation was initiated on the remote computer. The at least one processor is configured to confine the movable cursor to a portion of the client user interface that is outside the visual representation of the remote computer system. The at least one processor is configured to establish a source proxy window that encompasses the portion of the client user interface within which the movable cursor is confined. The at least one processor is configured to release the movable cursor. The at least one processor is configured to continue effectuating the drag-and-drop operation.

At least some examples of the client computer system can include one or more of the following features. The movable cursor is confined using a function that receives display coordinates defining the portion of the client user interface and that causes the client operating system to keep the movable cursor within the portion of the client user interface defined by the received display coordinates. The movable cursor is released in response to detecting a mouse event in the source proxy window. The source proxy window is established while the movable cursor remains confined to the portion of the client user interface. The movable cursor is confined using a ClipCursor function of the client operating system. The source proxy window is not visible within the client user interface. The at least one processor is further configured to execute a client virtualization agent that includes a client drag-and-drop agent; the client drag-and-drop agent is configured to receive, from a host drag-and-drop agent instantiated at the remote computer system, an event; and the client drag-and-drop agent is configured to confine the movable cursor in response to receiving the event from the host drag-and-drop agent. The at least one processor is further configured to execute a client virtualization agent that includes a client drag-and-drop agent; the client drag-and-drop agent is configured to receive, from a host drag-and-drop agent instantiated at the remote computer system, an event; and the event characterizes visual alterations to the client user interface as a result of movement of the movable cursor. The at least one processor is further configured to execute a client virtualization agent that includes a client drag-and-drop agent; and the client drag-and-drop agent is configured to receive, from a host drag-and-drop agent instantiated at the remote computer system, via a virtualization infrastructure that connects the client computer system and the remote computer system, an event. The at least one processor is further configured to execute a client virtualization agent that includes a client drag-and-drop agent; and the client drag-and-drop agent is configured to receive, from a host drag-and-drop agent instantiated at the remote computer system, via a virtualization infrastructure that connects the client computer system and the remote computer system, an event that characterizes visual alterations to the client user interface as a result of movement of the movable cursor. The at least one processor is further configured to execute a client virtualization agent that is configured to respond to the input initiating the drag-and-drop operation by transmitting a message to a host virtualization agent executing at the remote computer system. The at least one processor is further configured to detect that the movable cursor has left the digital workspace user interface. The at least one processor is further configured to detect that the movable cursor has left the digital workspace user interface; and the cursor is confined after detecting that the movable cursor has left the digital workspace user interface.

In another example, a non-transitory computer readable medium stores executable sequences of instructions to invoke a host-to-client drag-and-drop operation. The sequences of instructions comprise instructions to render, via a user interface, a first representation of a client computer system and a second representation of a remote computer system distinct from the client computer system. The sequences of instructions further comprise instructions to receive, via the user interface, input initiating a drag-and-drop operation of a digital resource provided by the remote computer system. The sequences of instructions further comprise instructions to detect that a cursor effectuating the drag-and-drop operation has left the second representation. The sequences of instructions further comprise instructions to confine the cursor to a portion of the first representation. The sequences of instructions further comprise instructions to move a source proxy window to encompass the portion of the first representation. The sequences of instructions further comprise instructions to free the cursor. The sequences of instructions further comprise instructions to initiate the drag-and-drop operation on the first representation.

At least some examples of the non-transitory computer readable medium can include one or more of the following features. The sequences of instructions further comprise instructions to the sequences of instructions further comprise instructions to execute a client virtualization agent that includes a client drag-and-drop agent; and receive, by the client drag-and-drop agent, from a host drag-and-drop agent instantiated at the remote computer system, an event; wherein the cursor is confined to the portion of the first representation in response to receiving the event from the host drag-and-drop agent. The cursor is confined using a function that receives display coordinates defining the portion of the first representation and that causes the client computer system to keep the cursor within the portion of the first representation defined by the received display coordinates. The cursor is freed in response to the source proxy window being positioned such that it encompasses a location of the cursor.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Figure 1:
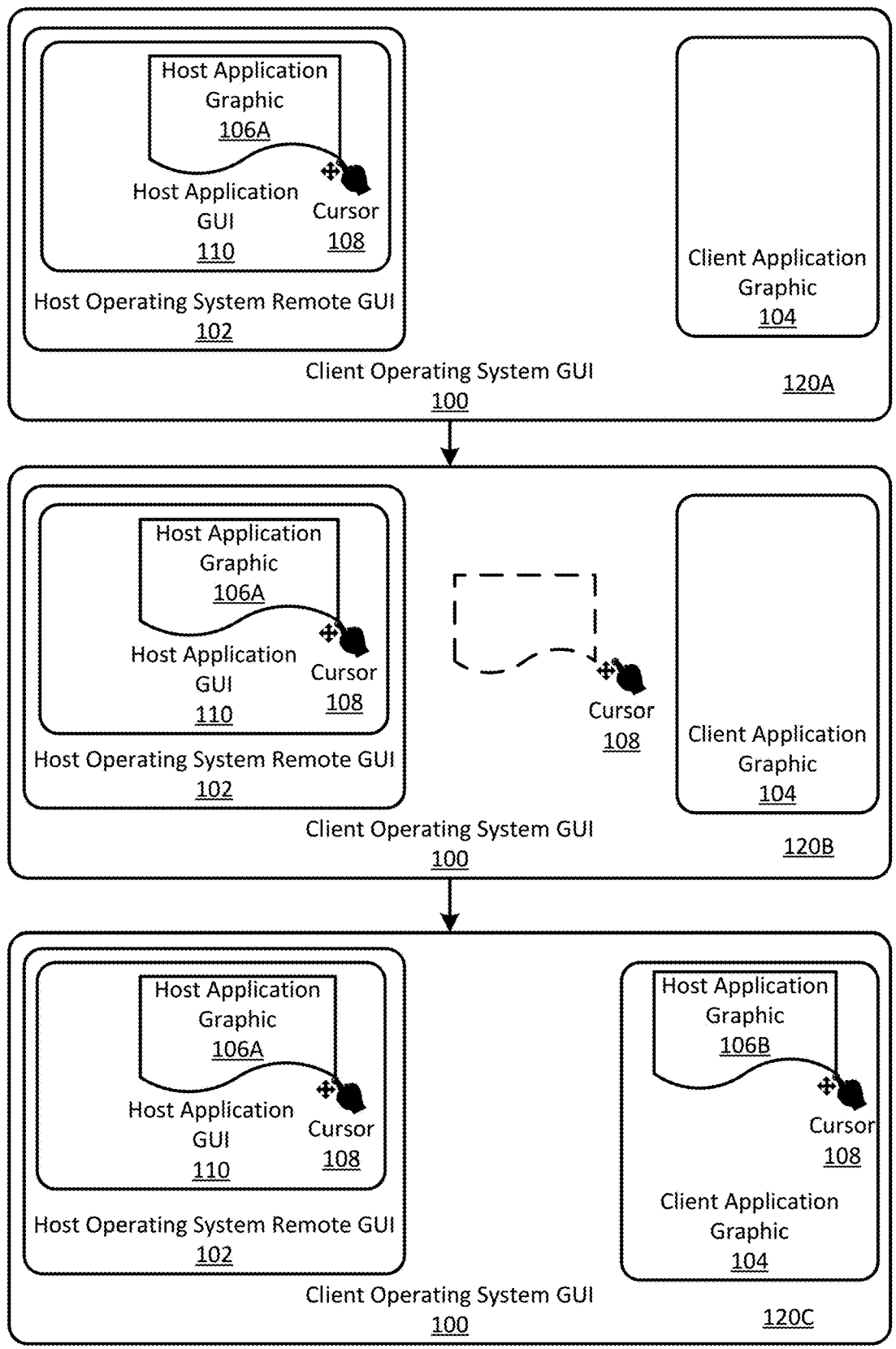
FIG. 1 is a block diagram illustrating a host to client DnD operation in accordance with an example of the present disclosure.

As summarized above, at least some examples described herein are directed to systems and processes that implement improved host to client DnD operations. One example of such a DnD operation is illustrated in FIG. 1. As shown in FIG. 1, a client computer renders an OS GUI 100. This client OS GUI 100 includes a remote OS GUI 102 generated by a host computer, a graphic 104 associated with a client application, and a cursor 108. The client application graphic 104 may be, for example, a GUI generated by the client application, an icon associated with the client application, or the like. In this example, the host computer transmits the remote GUI 102 to the client computer via a virtualization infrastructure. One example of a virtualization infrastructure will be described below with reference to FIG. 2. The remote GUI 102 includes a host application GUI 110 generated by a host application running on the host computer. This digital resource may be referred to as the "host resource". The host application GUI 110 includes a host application graphic 106A that represents a digital resource (for example, a link, file, and/or executable code) accessible via the host computer. The host application graphic 106A may be, for example, a GUI generated by the host application, an icon associated with the host application, data associated with the host application, or the like. In FIG. 1, visual aspects of the improved host to client DnD operation are illustrated in three frames 120A, 120B, and 120C.

In the frame 120A, a user has selected the host application graphic 106A to begin the DnD operation. The user drags the cursor 108 from its original location within the host application GUI 110 toward the client application graphic 104. In the frame 120B the cursor 108 has left the remote GUI 102 but has yet to enter the client application graphic 104. As shown in the frame 120B, the client OS GUI 100 has provided the user with a visual indication of the DnD operation by altering the appearance of the cursor 108 relative to its original appearance over the host application GUI 110. This visual indication communicates to the user that the DnD operation is underway but not yet complete. In frame 120C, the cursor 108 has arrived over the client application graphic 104 and the cursor has been de-actuated (dropped) by the user. This de-actuation by the user completes the DnD operation, and the client OS GUI 100 indicates this by rendering a host application graphic 106B over the client application graphic 104. The host application graphic 106B represents the host resource in the client application graphic 104. In some examples, upon completion of the DnD operation, the digital resource associated with the host application graphic 106A is provided to the client application for processing.

In the example of FIG. 1 described above, the drop target is the client application. However, other drop targets are possible. For instance, in another example, the drop target is the client OS. In this example, the DnD operation completes in the frame 120B and the digital resource is provided to the client OS for processing (for example copying, moving, etc.). Similarly, in the example of FIG. 1, the drop source is the host application. However, other drop sources are possible. For instance, in another example, the drop source is the host OS GUI.

Figure 2:
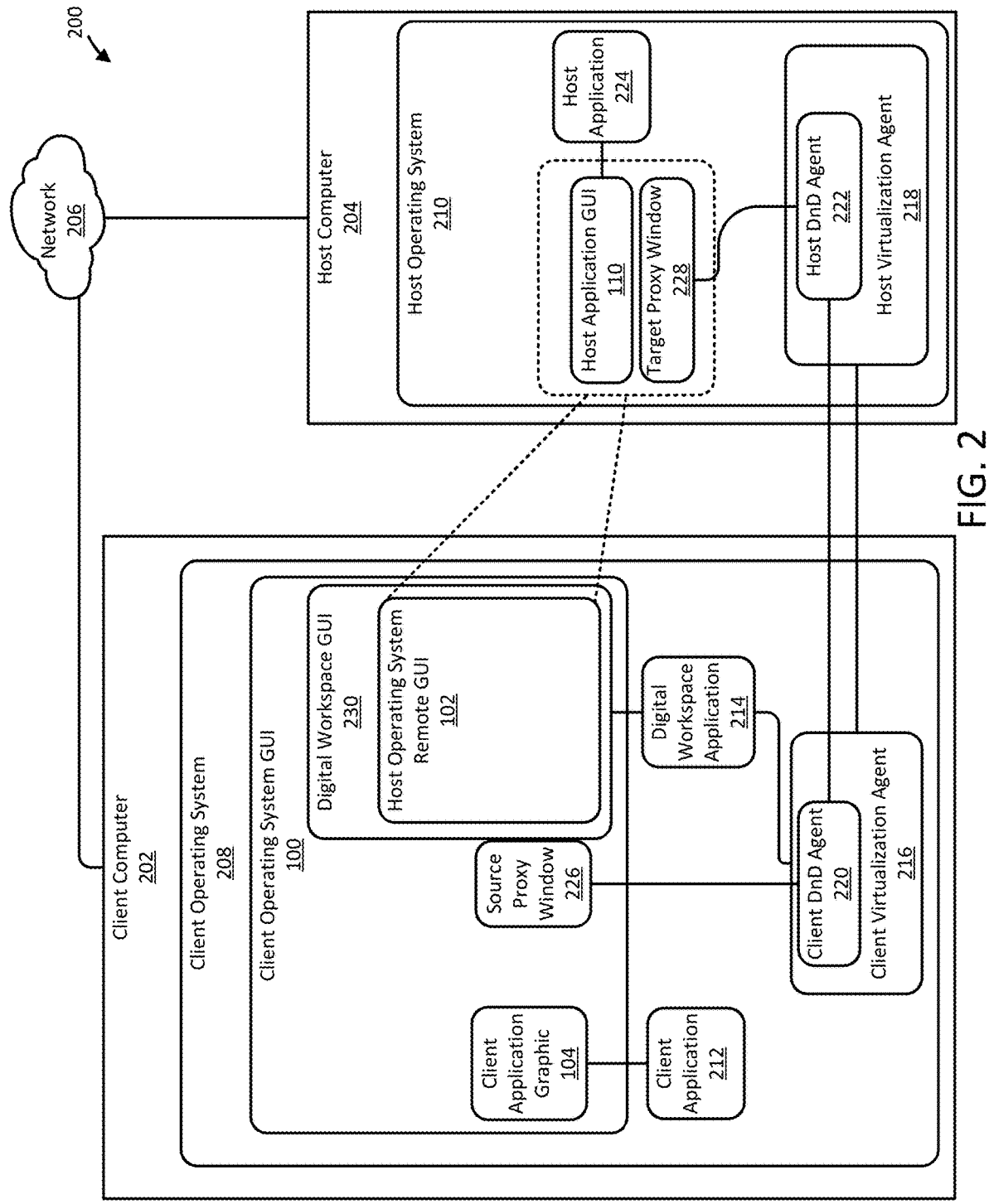
FIG. 2 is a block diagram illustrating a distributed computing system configured to implement an improved host to client DnD operation in accordance with an example of the present disclosure.

FIG. 2 illustrates a logical and physical architecture of a system 200 configured to implement improved host to client DnD operations. As shown in FIG. 2, the system 200 includes a client computer 202 and a host computer 204 that are configured to interoperate with one another via a network 206. The client computer 202 implements a variety of processes including a client OS 208, a client application 212, a digital workspace application 214, and a client virtualization agent 216. The client virtualization agent 216 includes a client DnD agent 220. The client computer 202 also renders the client OS GUI 100. The client OS GUI 100 includes the client application graphic 104, a digital workspace GUI 230, and a source proxy window 226. The workspace GUI 230 is generated by the workspace application 214 and includes the remote GUI 102 of FIG. 1. The source proxy window 226 is generated by the client DND agent 220. The remote GUI 102 includes the host application GUI 110 of FIG. 1, which is generated by a host application 224, and a target proxy window 228, which is generated by a host DnD agent 222. The host computer 204 implements processes including a host OS 210, a host virtualization agent 218, and the host application 224. The host virtualization agent 218 includes the host DnD agent 222. Examples of computing devices and OSs that can be configured as the client computer 202, the host computer 204, the network 206, the client OS 208, and the host OS 210 are described further below with reference to FIG. 5.

In some examples, the client agent 220 and the host agent 222 are configured to implement an improved host to client DnD operation. In these examples, the agents 220 and 222 are configured to monitor for user input selecting graphics (for example, the client application graphic 104) presented within the OS GUIs 100 and 102, setup invisible proxy windows (for example, the source and target proxy windows 226 and 228) within the OS GUIs 100 and 102, and exchange a variety of messages with one another and components of the OSs 208 and 210 to coordinate the improved DnD operation. Processes that the agents 220 and 222 are configured to execute to implement the improved host to client DnD operation are described further below with reference to FIGS. 3A-4B.

As shown in FIG. 2, the host virtualization agent 218 and the client virtualization agent 216 are configured to interoperate within a virtualization infrastructure. This virtualization infrastructure enables an application or OS (for example, the host OS 210) executing within a first physical computing environment (for example, the host computer 204) to be accessed by a user of a second physical computing environment (for example, an endpoint device, such as the client computer 202) as if the application or OS was executing within the second physical computing environment. Within the virtualization infrastructure, the host virtualization agent 218 is configured to make a computing environment in which it operates available to execute virtual (or remote) computing sessions. The host virtualization agent 218 can be further configured to manage connections between these virtual computing sessions and other processes within the virtualization infrastructure, such as the client virtualization agent 216. In a complementary fashion, the client virtualization agent 216 is configured to instigate and connect to the virtual computing sessions managed by the host virtualization agent 218. The client virtualization agent 216 is also configured to interoperate with other processes executing within its computing environment (for example, the workspace application 214) to provide those processes with access to the virtual computing sessions and the virtual resources (for example, the remote GUI 102) therein. Within the context of a Citrix HDX™ virtualization infrastructure, the host virtualization agent 218 can be implemented as, for example, a virtual delivery agent installed on a physical or virtual server or desktop and the client virtualization agent 216 can be implemented as a local service in support of, for example, a Citrix Workspace™ client agent or Citrix Receiver™ for hypertext markup language (HTML) 5 browsers.

As shown in FIG. 2, the workspace application 214 is a software program configured to deliver and manage a user's applications, data, and desktops in a consistent and secure manner, regardless of the user's device or location. The workspace application 214 enhances the user experience by streamlining and automating those tasks that a user performs frequently, such as approving expense reports, confirming calendar appointments, submitting helpdesk tickets, and reviewing vacation requests. The workspace application 214 allows users to access functionality provided by multiple enterprise applications—including "software as a service" (SaaS) applications, web applications, desktop applications, and proprietary applications—through a single interface. In certain implementations, the workspace application 214 includes an embedded browser. The embedded browser can be implemented, for example, using the Chromium Embedded Framework.

Figure 3A:
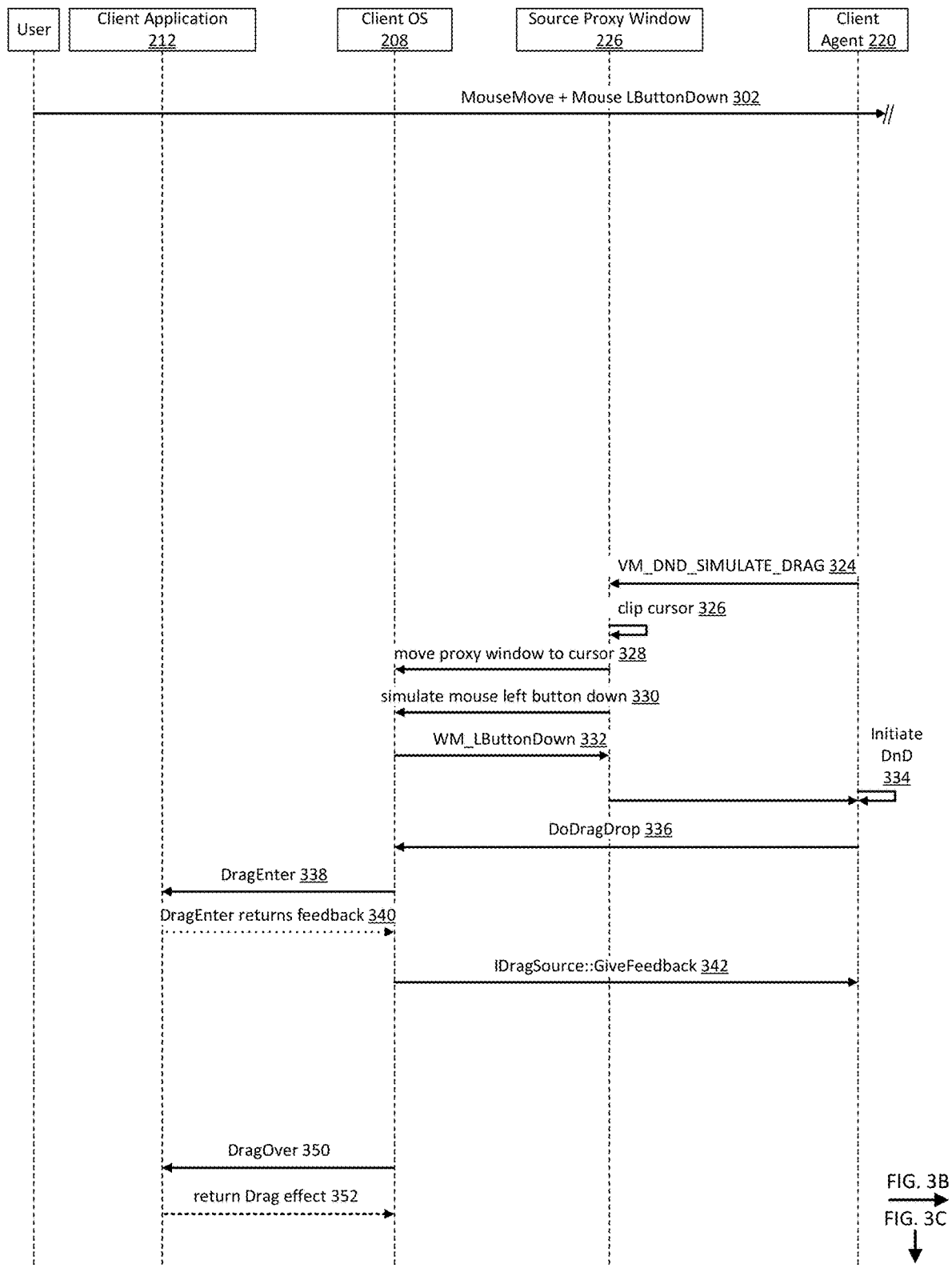
FIGS. 3A through 3D are a sequence diagram of a DnD process executed by a distributed computing system in accordance with an example of the present disclosure.
Figure 3B:
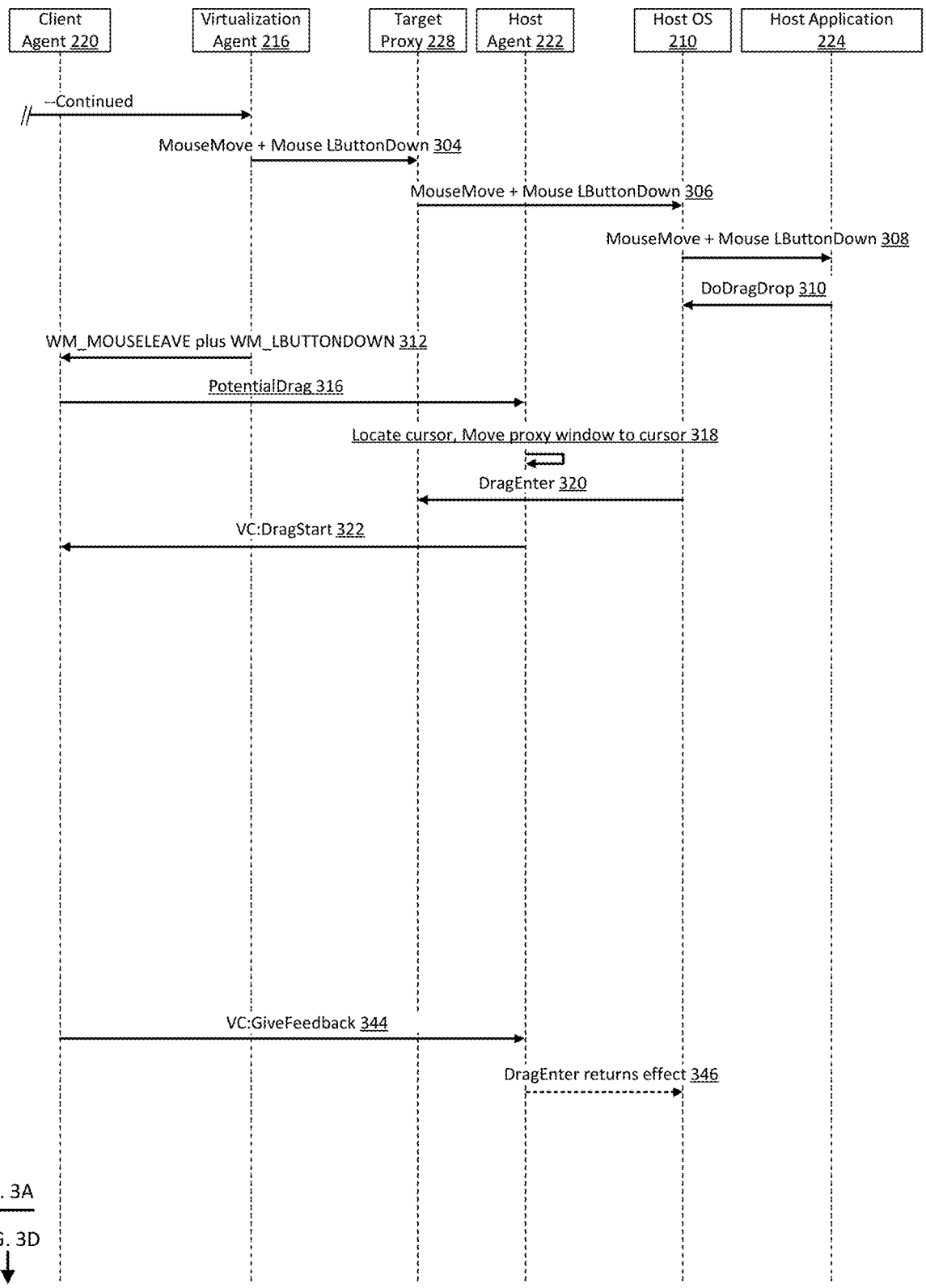

FIGS. 3A-3D illustrate a sequence of operations executed by the system 200 in an example directed to Microsoft Windows® OSs. As shown in FIGS. 3A and 3B, the sequence begins with the client virtualization agent 216 receiving 302 user input in the form of a left mouse button client on a host graphic (for example, the host application graphic 106A of FIG. 1) and subsequent movement of the mouse. The virtualization agent 216 passes 304 the input to the target proxy window 228 via the host virtualization agent 218. The host OS 210 detects 306 the input within the target proxy window 228 and, in response, transmits 308 WM_MOUSEMOVE and WM_LBUTTONDOWN messages to the host application 224. The host application 224 processes the input and identifies the input as the initiation of a DnD operation. As such, the host application 224 notifies the host OS 210 of the initiation of a DnD operation by calling 310 the DoDragDrop( ) OS function.

Subsequently, the virtualization agent 216 receives messages from the client OS indicating that the user has dragged the cursor outside of the host application GUI 110 and/or outside of the digital workspace GUI 230. These messages can include WM_MOUSELEAVE and WM_LBUTTONDOWN messages. The virtualization agent 216 passes 312 the messages to the client DnD agent 220. The client DnD agent 220 transmits 316 a message to the host DnD agent 222 that indicates a potential drag-and-drop operation is underway.

In response to reception of the potential drag message, the host DnD agent 222 locates the cursor within its local representation of the remote GUI 102 and moves 318 the target proxy window 228 to the location of the cursor. This movement causes the host OS 210 to detect the cursor moving into the target proxy window 228 which, in turn, causes the host OS 210 to raise 320 a DragEnter event with the target proxy window 228. The target proxy window 228 passes the DragEnter event to the host DnD agent 222. The host DnD agent 222 handles the DragEnter event and transmits 322 a DragStart event via a virtual channel provided by the virtualization infrastructure to the client DnD agent 220.

The client DnD agent 220 simulates 324 a drag into the client OS GUI 100 by executing a particular sequence of operations. First, the client DnD agent 220 restricts cursor movement. In the context of Microsoft Windows® OSs, this can be accomplished by calling 326 the ClipCursor( ) OS function to prevent the cursor from moving beyond a bounded area. Next, the client DnD agent 220 moves 328 the source proxy window 226 to the location of the cursor in the client OS GUI 100 and simulates 330 a mouse left button down in the source proxy window 226 which, in turn, causes the client OS 208 to send 332 a WM_LButtonDown message to the source proxy window 226. The client DnD agent 220 optionally initiates 334 a drag-and-drop operation at client computer 202. The client DnD agent 220 initiates the drag and calls 336 the DoDragDrop( ) OS function, thereby notifying the client OS 208 that a drag-and-drop operation is underway.

Subsequently, the client OS 208 detects that the dragged cursor has entered a representation of the client application 212 (for example, the client application graphic 104 of FIG. 1). In response, the client OS 208 raises 338 a DragEnter event with the client application 212. The client application 212 handles the DragEnter event and responds 340 to the client OS 208 with requested visual alterations to the cursor and/or other elements of the client OS 208 to communicate to the user that the cursor has entered the representation of the client application 212. The client OS 208 communicates 342 the requested visual alterations to the client DnD agent 220. In the context of Microsoft Windows® OSs, the client OS 208 calls GiveFeedback and the client DnD agent 220 receives GiveFeedback. The client DnD agent 220 transmits 344 the feedback via a virtual channel provided by the virtualization infrastructure to the host DnD agent 222. The host DnD agent 222 processes the GiveFeedback event and transmits 346 a message specifying the requested visual alterations to the host OS 210. In the context of Microsoft Windows® OSs, feedback can be provided to the host OS through DragEnter or DragOver.

Subsequently, the client OS 208 detects that the dragged cursor is over the representation of the client application 212. In response, the client OS 208 raises 350 a DragOver event with the client application 212. The client application 212 handles the DragOver event and responds 352 to the client OS 208 with requested visual alterations. These alterations to the cursor and/or other elements of the client OS 208 communicate to the user that the cursor is over the representation of the client application 212.

Figure 3C:
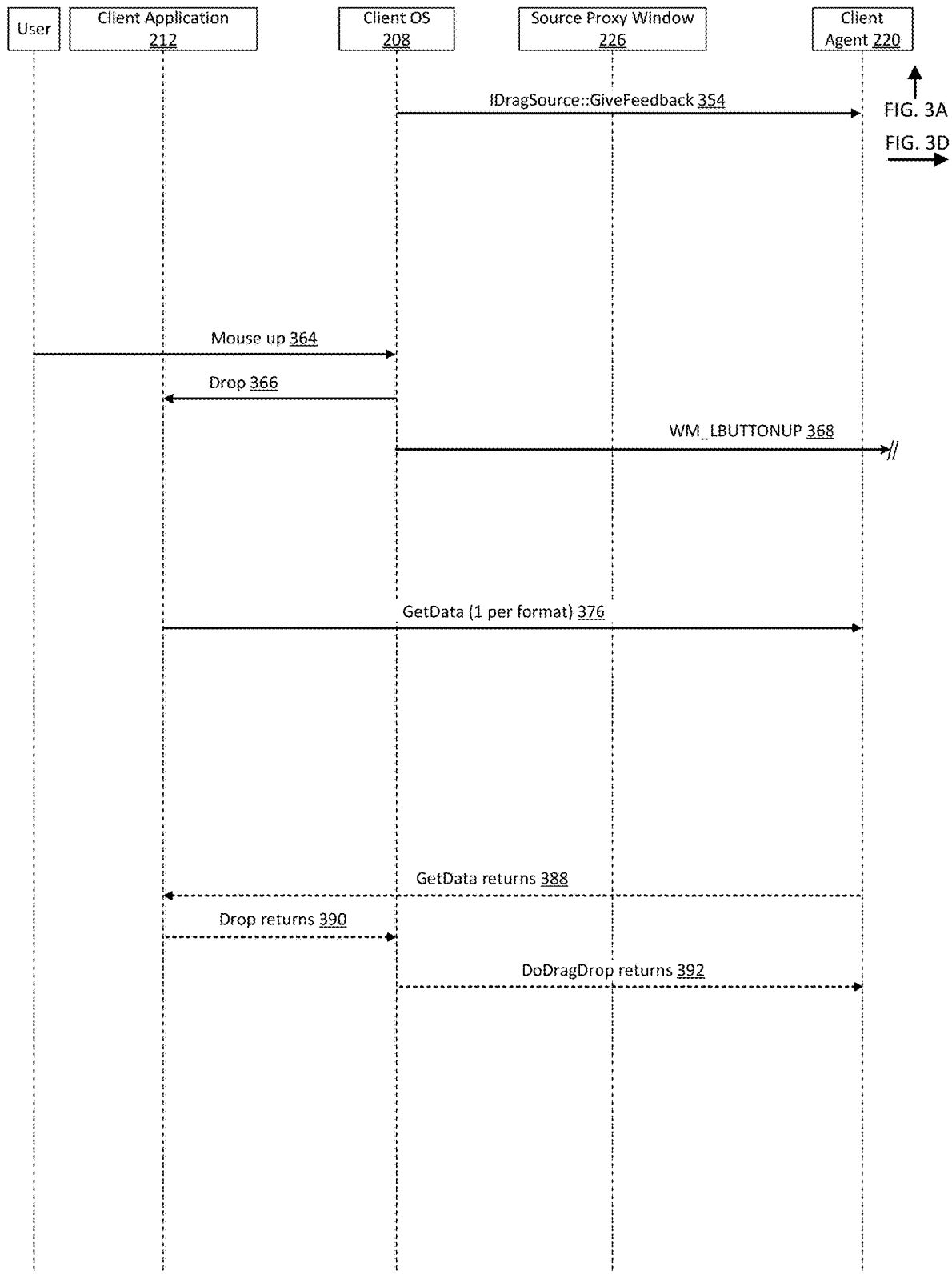
Figure 3D:
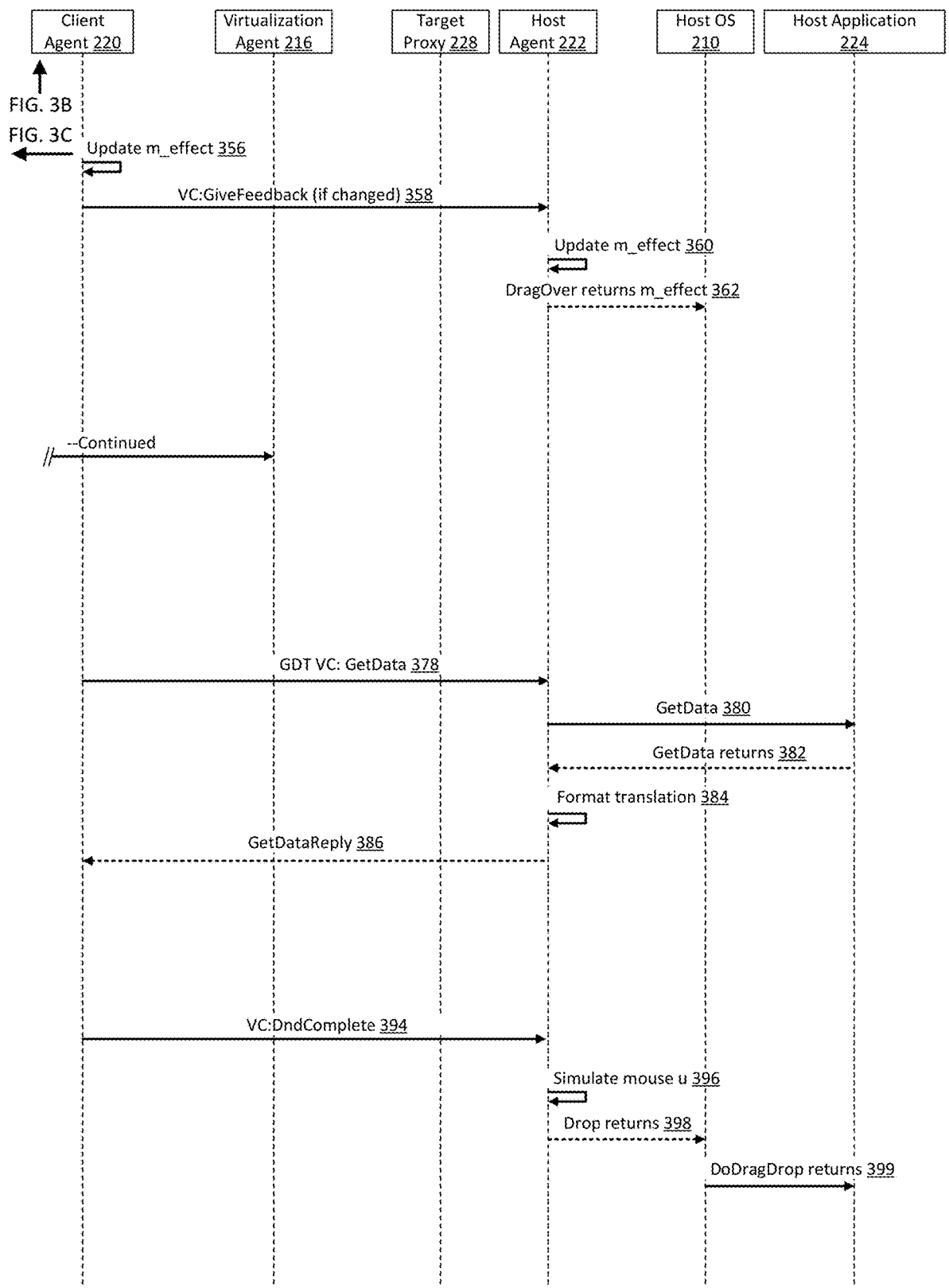

With combined reference to FIGS. 3C and 3D, the client OS 208 communicates 354 the requested visual alterations to the client DnD agent 220. In the context of Microsoft Windows® OSs, this can be accomplished through GiveFeedback to the client DnD agent. The client DnD agent 220 handles the GiveFeedback event. In so doing, the client DnD agent 220 determines whether the requested visual alterations associated with the DragEnter event are different from the requested visual alterations associated with the DragOver event. If so, the client DnD agent 220 updates 356 its local copy of the visual alterations and transmits 358 a GiveFeedback event via a virtual channel provided by the virtualization infrastructure to the host DnD agent 222. If not, the client DnD agent does not transmit the GiveFeedback event. Where the client DnD agent 220 does transmit 358 the GiveFeedback event, the host DnD agent 222 processes the GiveFeedback event, updates 360 the requested visual alterations, and provides 362 the requested visual alterations to the host OS 210 through DragEnter or DragOver.

Subsequently, the client OS 208 receives 364 input indicating that the user has released the left mouse button, thus signaling the drop action at the client and requesting data transfer to complete the DnD operation. In response, the client OS 208 raises 366 a Drop event with the client application 212. The client OS 208 also transmits 368 the WM_LBUTTONUP message to the virtualization agent 216. In response to receiving notification that the DnD operation at the client is complete, the host can simulate subsequent mouse operations, such as a mouse up operation, to complete the host side of the DnD operation, as will be described in turn.

In handling the Drop event, the client application 212 requests 376 data from the client DnD agent 220. In the context of Microsoft Windows® OSs, this can be accomplished by calling a GetData( ) method that is exposed and implemented by the client DnD agent 220. In executing the GetData( ) method, the client DnD agent 220 transmits 378 a message to the host agent 222 that requests the data requested by the client application 212. The host DnD agent 222 processes the message and executes 380 a GetData( ) method exposed and implemented by the host application 224. In executing the GetData( ) method, the host application returns 382 the requested data. The host DnD agent 222 formats 384 the requested data and transmits 386 a response to the client DnD agent 220 that includes the formatted and requested data. The client DnD agent 220 returns 388 the formatted and requested data to the client application 212.

Having the data needed to complete the DnD operation, the client application 212 finishes its handling of the Drop event and returns 390 to the client OS 208. The client OS 208, in turn, completes processing of the DoDragDrop( ) OS function and returns 392 to the client DnD agent 220. The client DnD agent 220 transmits 394, via a virtual channel provided by the virtualization infrastructure, a message to the host DnD agent 222 that indicates the DnD operation is complete. The host DnD agent 222, in completing its handling of the Drop event raised in operation 374, simulates 396 a mouse up over the target proxy window 238 and returns 398 control to the host OS 210. The host OS 210, in turn, completes processing of the DoDragDrop( ) OS function called in operation 310 and returns 399 to the host application 224. After operation 399, the sequence illustrated in FIGS. 3A-3D ends.

Figure 4A:
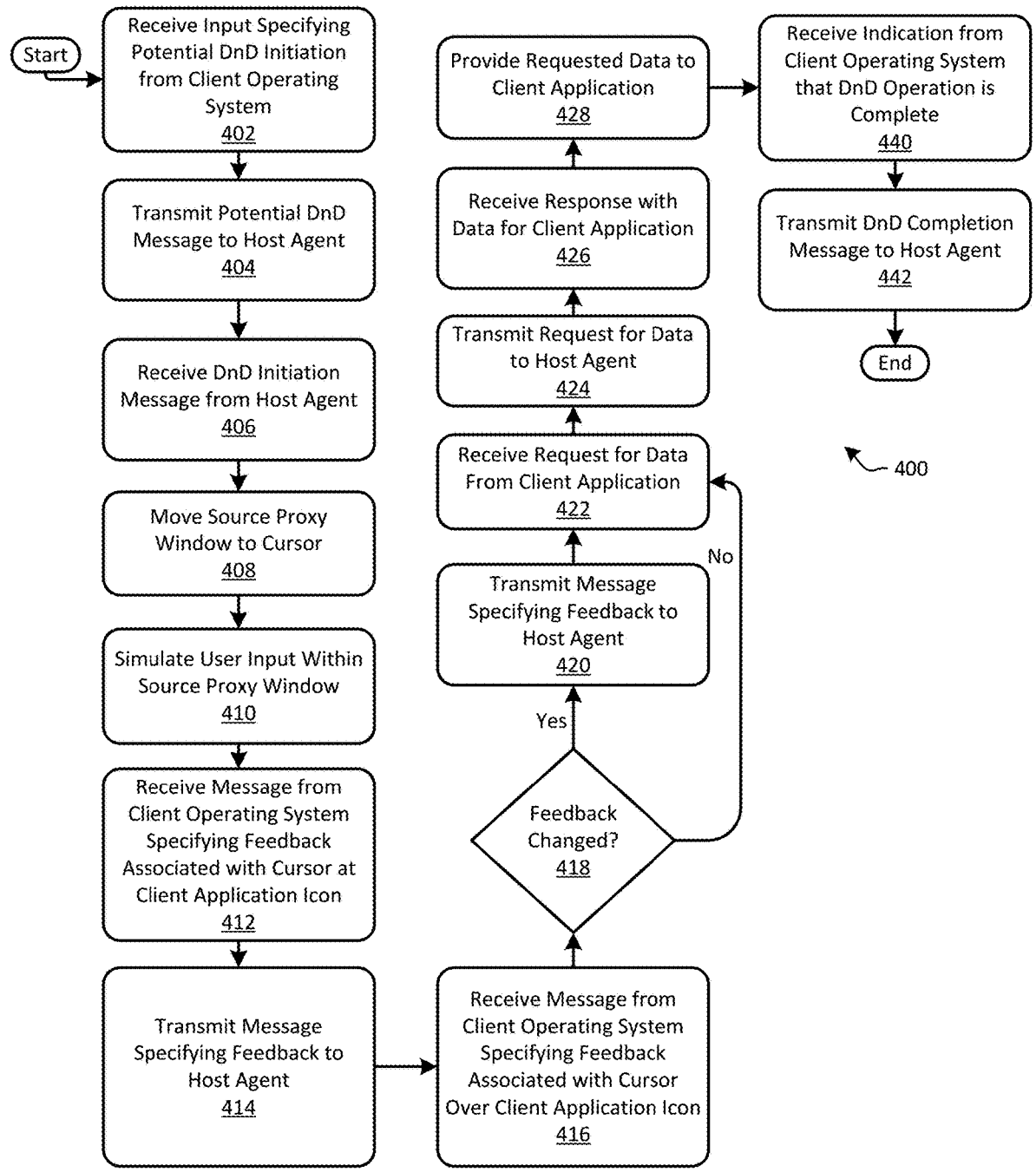
FIG. 4A is a flow diagram of a DnD process executed by a client DnD agent in accordance with an example of the present disclosure.

FIG. 4A illustrates an example DnD coordination process 400 executed by a client DnD agent (for example, the agent 220 of FIG. 2) in some implementations. As shown in FIG. 4A, the process 400 starts with the client DnD agent receiving 402 a message indicating reception of input from a user via a GUI (for example the client OS GUI 100 of FIGS. 1 and 2) rendered by a client device (for example, the client computer 202 of FIG. 2). In this example, the message specifies that the input has the potential to initiate a DnD operation. For instance, the message can specify that a user has selected a graphic (for example, the host application graphic 106A of FIG. 1) that is associated with a host application (for example, the host application 110 of FIG. 1) within a host OS (for example, the host OS 210 of FIG. 2). In some examples directed to Microsoft Windows® OSs, the reception of the message can include reception of WM_MOUSEMOVE and WM_LBUTTONDOWN messages specifying the location of the graphic. In some examples, this message is received from an OS (for example, the client OS 208 of FIG. 2) of the client device. In other examples, this message is received from a client virtualization agent (for example, the agent 216 of FIG. 2) executing locally to the client device. The client virtualization agent can, in these examples, receive the message from the client OS and pass the message to the client DnD agent.

Continuing with the process 400, the client DnD agent transmits 404 a message to a host DnD agent (for example, the agent 222 of FIG. 2) indicating that a DnD operation has potentially been initiated by the user. This message enables the host DnD agent to execute operations needed to coordinate the improved host to client DnD operation within an OS (for example, the host OS 210 of FIG. 2) of a host device (for example, the host computer 204 of FIG. 2). Examples of these operations are described below with reference to FIG. 4B.

Continuing with the process 400, the client DnD agent receives 406 a message from the host DnD agent confirming initiation of the DnD operation. In response to reception of the DnD confirmation message, the client DnD agent moves 408 a source proxy window associated with the client DnD (for example, the source proxy window 226 of FIG. 2) agent to the cursor. In some examples, to move the source proxy window to the cursor, the client DnD agent confines the cursor to its current location within the client OS GUI. For instance in some examples directed to Microsoft Windows® OSs, the client DnD agent calls the ClipCursor( ) OS function. Next, the client DnD agent interoperates with the client OS to move the source proxy window to cover the current location of the cursor. For instance, in some examples directed to Microsoft Windows® OSs, the client DnD agent calls the SetWindowPlacement( ) OS function to move the source proxy window to the location of the cursor.

Continuing with the process 400, the client DnD agent simulates 410 user input to initiate a DnD operation within the source proxy window. For instance, in some examples directed to Microsoft Windows® OSs, the client DnD agent calls the SendInput( ) OS function to simulate the user input. Simulation of the user input causes the client OS to transmit a message specifying the user input to the source proxy window. After moving the source proxy window to the location of the cursor and receiving the mouse button down input, the client DnD agent releases the cursor. The provides consistent receipt of WM_LButtonDown in the source proxy window on the client, after which the cursor is released. The source proxy window, in turn, passes the message to the client DnD agent. In response to receiving the message, the client DnD agent calls the DoDragDrop( ) OS function to notify the client OS that a DnD operation has been initiated within the source proxy window.

Continuing with the process 400, the client DnD agent receives 412 a message from the client OS specifying any appropriate visual indications (for example, alterations to the visual appearance of the cursor). For instance, in some examples directed to Microsoft Windows® OSs, the reception of the message can include reception of GiveFeedback.

Continuing with the process 400, the client DnD agent transmits 414 a message to the host agent specifying the visual indications requested by the client application.

Continuing with the process 400, the client DnD agent receives 416 a message from the client OS specifying any visual indications requested by a client application upon the cursor being over the client application graphic. For instance, in some examples directed to Microsoft Windows® OSs, the message can specify the GiveFeedback event received by the client DnD agent.

Continuing with the process 400, the client DnD agent determines 418 whether the visual indications requested upon entry of the cursor into the client application graphic are different from the visual indications requested by the cursor being over the client application graphic. Where the client DnD agent determines 418 that the visual indications are different, the client DnD agent proceeds to operation 420. Where the client DnD agent determines 418 that the visual indications are not different, the client DnD agent proceeds to operation 422.

Continuing with the process 400, the client DnD agent transmits 420 a message to the host DnD agent specifying the visual indications requested by the client application upon the cursor being over the client OS GUI.

Continuing with the process 400, the client DnD agent receives 422 a request from the client application for data to be processed as a result of the DnD operation. For instance, in some examples directed to Microsoft Windows® OSs, the request can come via the client OS in response to the client application calling the GetData( ) method of the data object passed by the client OS in association with a Drop event.

Continuing with the process 400, the client DnD agent transmits 424 a message to the host DnD agent requesting the data to be provided to the client application. The host DnD agent will then request data from the host application.

Continuing with the process 400, the client DnD agent receives 426 a message from the host DnD agent specifying the data requested by the client application. This data is provided by the host application, for example, in response to reception of a message from the host DnD agent. For instance, in some examples directed to Microsoft Windows® OSs, the host application can provide the data in response to a message received from the host OS as a result of the host DnD agent calling the GetData( ) method of the data object passed by the host OS in association with a Drop event.

Continuing with the process 400, the client DnD agent provides 428 requested data to the client application. For instance, in some examples directed to Microsoft Windows® OSs, the message is transmitted to the client application by responding to the client OS message received in the operation 422.

Continuing with the process 400, the client DnD agent receives 440 an indication from the client OS specifying completion of the DnD operation. For instance, in some examples directed to Microsoft Windows® OSs, the DoDragDrop( ) OS function called in the operation 410 returns.

Continuing with the process 400, the client DnD agent transmits 442 a message to the host DnD agent specifying completion of the DnD operation. After execution of the operation 442, the process 400 ends.

Figure 4B:
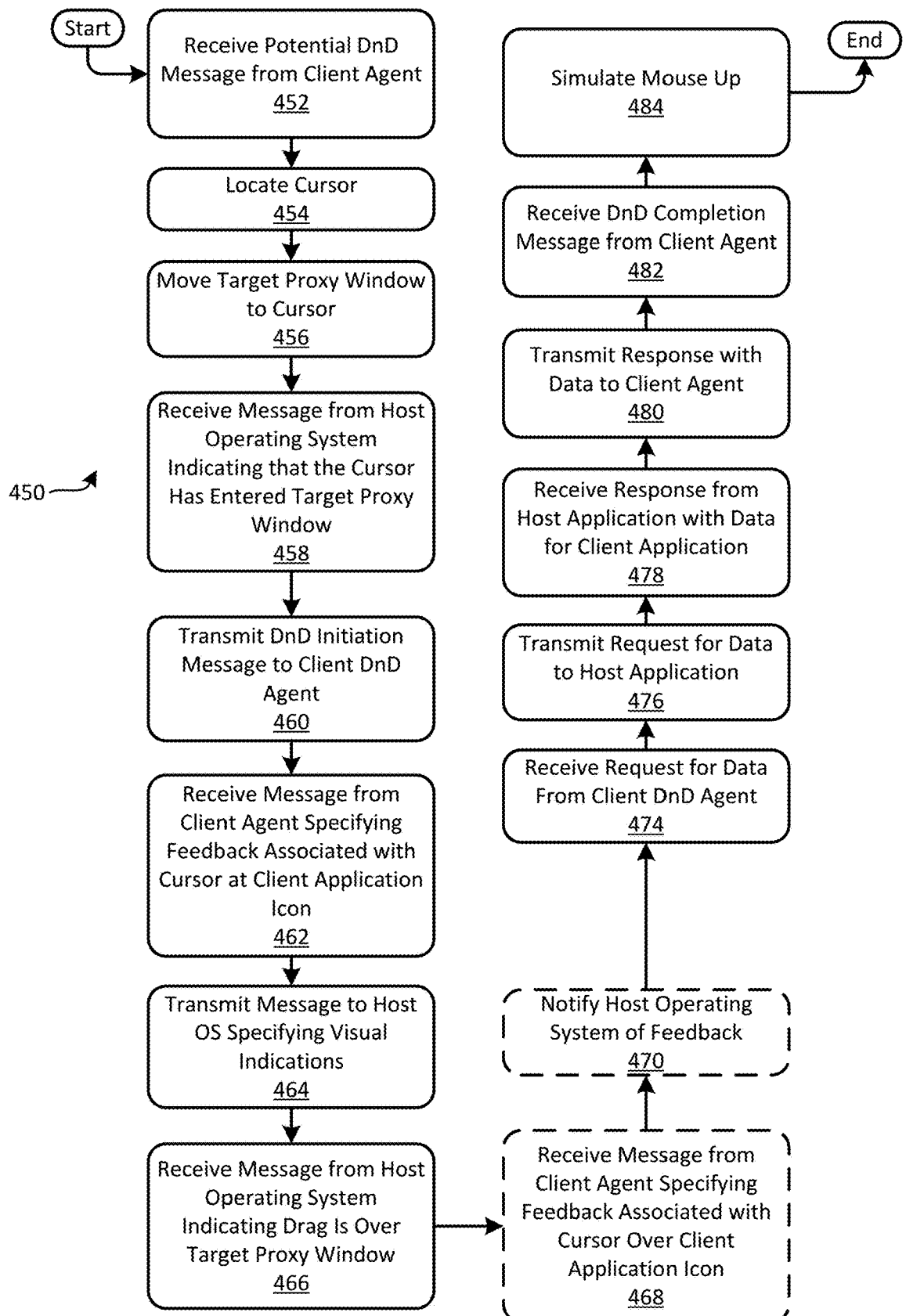
FIG. 4B is a flow diagram of a DnD process executed by a host DnD agent in accordance with an example of the present disclosure.

FIG. 4B illustrates an example DnD coordination process 450 executed by a host DnD agent (for example, the agent 222 of FIG. 2) in some implementations. As shown in FIG. 4B, the process 450 starts with the host DnD agent receiving 452 a message from a client DnD agent (for example, the agent 220 of FIG. 2) indicating reception of input from a user via a GUI (for example the client OS GUI 100 of FIGS. 1 and 2) rendered by a client device (for example, the client computer 202 of FIG. 2). In this example, the message specifies that the input has the potential to initiate a DnD operation. For instance, the message can specify that a user has selected a graphic (for example, the host application graphic 106A of FIG. 1) that is associated with a host application and has dragged the selection out of the host GUI boundary (for example, the host application 110 of FIG. 1) within a host OS (for example, the host OS 210 of FIG. 2).

Continuing with the process 450, the host DnD agent locates 454 a cursor within a GUI (for example the remote GUI 102 of FIGS. 1 and 2) generated by a host device (for example, the host computer 204 of FIG. 2). For instance in some examples directed to Microsoft Windows® OSs, the host DnD agent calls the GetCursorPos( ) OS function.

Continuing with the process 450, the host DnD agent moves 456 a target proxy window (for example, the target proxy window 228 of FIG. 2) associated with the host DnD agent to the cursor location within the host OS GUI. For instance in some examples directed to Microsoft Windows® OSs, the host DnD agent calls the SetWindowPlacement( ) OS function to move the target proxy window to the location of the cursor. In other examples, to move the target proxy window to the cursor location, the host DnD agent confines the cursor to its current location within the host OS GUI. For instance in some examples directed to Microsoft Windows® OSs, the host DnD agent calls the ClipCursor( ) OS function.

Continuing with the process 450, the host DnD agent receives 458, due to execution of the operation 456, a message from the host OS indicating that a detected DnD operation has started. In some examples directed to Microsoft Windows® OSs, the reception of the message can include reception of the DragEnter event from the host OS. After moving the target proxy window, the host DnD agent also releases the cursor. For instance in some examples directed to Microsoft Windows® OSs, the host DnD agent again calls the ClipCursor( ) OS function.

Continuing with the process 450, the host DnD agent transmits 460 a message to the client DnD agent confirming initiation of the DnD operation. The host DnD agent then receives 462 a message from the client DnD agent specifying any appropriate visual indications. The host DnD agent transmits 464 a message to the host OS specifying the visual indications. For instance, in some examples directed to Microsoft Windows® OSs, the message can be a response to the DragEnter.

Continuing with the process 450, the host DnD agent receives 466 a message from the host OS indicating that the drag is over the target proxy window. In some examples directed to Microsoft Windows® OSs, the reception of the message can include reception of the DragOver event from the host OS.

Continuing with the process 450, the host DnD agent optionally receives 468 a message from the client DnD agent specifying any appropriate visual indications. The host DnD agent also optionally transmits 470 a message to the host OS specifying the visual indications from the client application upon the cursor drag action over the client application graphic. For instance, in some examples directed to Microsoft Windows® OSs, the message can be a response to the DragOver.

Continuing with the process 450, the host DnD agent receives 474 a message from the client DnD agent requesting data to be processed as a result of the DnD operation. In response, the host DnD agent transmits 476 a message to the host application requesting the digital resource associated with the graphic.

Continuing with the process 450, the host DnD agent requests and receives 478 data from the host application requested in the operation 474. For instance, in some examples directed to Microsoft Windows® OSs, the data can be a response to the GetData( ) method. The host DnD agent then transmits 480 a message to the client DnD agent specifying the data requested by the client application.

Continuing with the process 450, the host DnD agent receives 482 a message from the client DnD agent specifying completion of the DnD operation. In response, the host DnD agent simulates 484 a mouse up input. The host DnD agent receives and responds to a message indicating a drop action from the host OS. The process 450 then ends.

The processes as disclosed herein each depict one particular sequence of operations in a particular example. Some operations are optional and, as such, can be omitted in accord with one or more examples. Additionally, the order of operations can be altered, or other operations can be added, without departing from the scope of the apparatus and methods described herein.

COMPUTING DEVICE FOR IMPROVED HOST TO CLIENT DnD OPERATIONS

Figure 5:
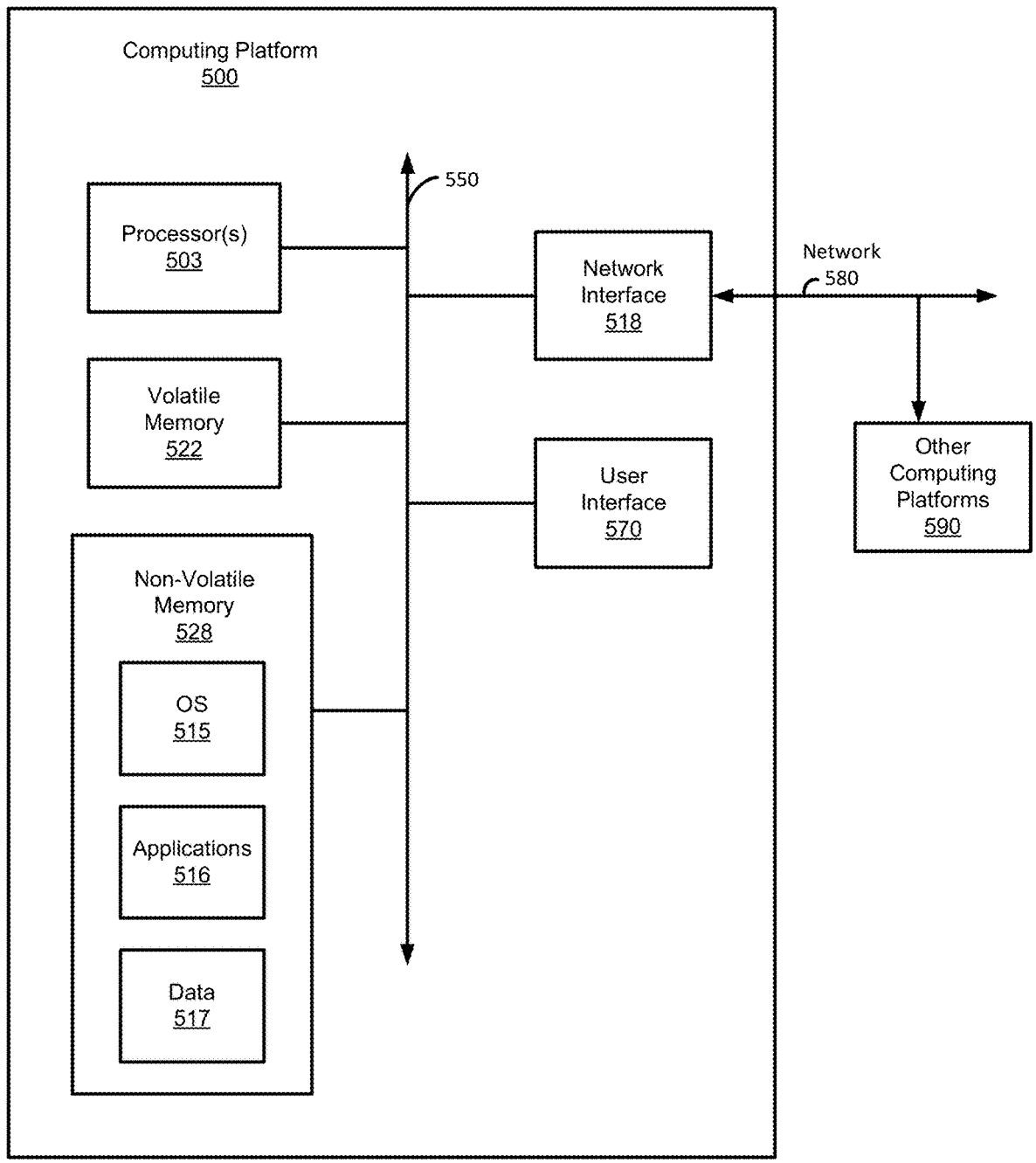
FIG. 5 is a block diagram of a network environment of computing devices in which various aspects of the present disclosure can be implemented.

FIG. 5 is a block diagram of a computing device 500 configured to implement various improved host to client DnD systems and processes in accordance with examples disclosed herein.

The computing device 500 includes one or more processor(s) 503, volatile memory 522 (for example, random access memory (RAM)), non-volatile memory 528, a user interface (UI) 570, one or more network or communication interfaces 518, and a communications bus 550. The computing device 500 may also be referred to as a client device, computing device, endpoint, computer, or a computer system.

The non-volatile (non-transitory) memory 528 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 570 can include a graphical user interface (GUI) (for example, controls presented on a touchscreen, a display, etc.) and one or more input/output (I/O) devices (for example, a mouse, a keyboard, a microphone, one or more speakers, one or more cameras, one or more biometric scanners, one or more environmental sensors, and one or more accelerometers, one or more visors, etc.). References to a "left mouse button" or "mouse left button" operation refer to a primary selection button on a mouse having multiple buttons, and thus encompass actuation of a right mouse button on a mouse configured for use with a person's left hand.

The non-volatile memory 528 stores an OS 515, one or more applications or programs 516, and data 517. The OS 515 and the application 516 include sequences of instructions that are encoded for execution by processor(s) 503. Execution of these instructions results in manipulated data. Prior to their execution, the instructions can be copied to the volatile memory 522. In some examples, the volatile memory 522 can include one or more types of RAM and/or a cache memory that can offer a faster response time than a main memory. Data can be entered through the user interface 570 or received from the other I/O device(s), such as the network interface 518. The various elements of the device 500 described above can communicate with one another via the communications bus 550.

The illustrated computing device 500 is shown merely as an example client device or server and can be implemented within any computing or processing environment with any type of physical or virtual machine or set of physical and virtual machines that can have suitable hardware and/or software capable of operating as described herein.

The processor(s) 503 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 503 can be analog, digital or mixed. In some examples, the processor(s) 503 can be one or more local physical processors or one or more remote-located physical processors. A processor including multiple processor cores and/or multiple processors can provide functionality for parallel, simultaneous execution of instructions or for parallel, simultaneous execution of one instruction on more than one piece of data.

The network interfaces 518 can include one or more interfaces to enable the computing device 500 to access a computer network 580 such as a Local Area Network (LAN), a Wide Area Network (WAN), a Personal Area Network (PAN), or the Internet through a variety of wired and/or wireless connections, including cellular connections and Bluetooth connections. In some examples, the network 580 may allow for communication with other computing devices 590, to enable distributed computing.

In described examples, the computing device 500 can execute an application on behalf of a user of a client device. For example, the computing device 500 can execute one or more virtual machines managed by a hypervisor. Each virtual machine can provide an execution session within which applications execute on behalf of a user or a client device, such as a hosted desktop session. The computing device 500 can also execute a terminal services session to provide a hosted desktop environment. The computing device 500 can provide access to a host computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method for invoking a host-to-client drag-and-drop operation, the method comprising:
   rendering, via a user interface, a first representation of a client computer system and a second representation of a remote computer system distinct from the client computer system;
   receiving, via the user interface, input initiating a drag-and-drop operation of a digital resource provided by the remote computer system;
   detecting that a cursor effectuating the drag-and-drop operation has left the second representation and entered the first representation;
   confining the cursor to a portion of the first representation;
   positioning a source proxy window to encompass the portion of the first representation, wherein the source proxy window is established while the cursor remains confined to the portion of the first representation;
   after positioning the source proxy window, freeing the cursor; and
   initiating the drag-and-drop operation on the first representation.

2. The method of claim 1, wherein the cursor is freed in response to detecting a mouse event in the source proxy window.

3. The method of claim 1, wherein the source proxy window is not visible within the user interface.

4. The method of claim 1, wherein the cursor is freed after the source proxy window is positioned such that it encompasses a location of the cursor.

5. The method of claim 1, wherein the cursor is confined using a ClipCursor function of an operating system executing at the client computer system.

6. The method of claim 1, wherein the cursor is freed in response to the source proxy window being positioned such that it encompasses a location of the cursor.

7. A client computer system comprising a memory and at least one processor coupled to the memory, wherein the at least one processor is configured to:
   execute a client operating system that, when executed, renders a client user interface;
   execute a digital workspace application that, when executed, renders a digital workspace user interface within the client user interface, wherein the digital workspace user interface includes a visual representation of a remote computer system that is distinct from the client computer system;
   receive input initiating a drag-and-drop operation on a digital resource provided by the remote computer system;
   detect that a movable cursor effectuating the drag-and-drop operation has left the visual representation of the remote computer system;
   confine the movable cursor to a portion of the client user interface that is outside the visual representation of the remote computer system;
   establish a source proxy window that encompasses the portion of the client user interface within which the movable cursor is confined;
   release the movable cursor after establishing the source proxy window, wherein the movable cursor is released in response to the source proxy window being positioned such that it encompasses a location of the movable cursor; and
   continue effectuating the drag-and-drop operation.

8. The system of claim 7, wherein the movable cursor is released further in response to detecting a mouse event in the source proxy window.

9. The system of claim 7, wherein the source proxy window is not visible within the client user interface.

10. The system of claim 7, wherein the movable cursor is confined using a ClipCursor function of the client operating system.

11. The system of claim 7, wherein the input initiating the drag-and-drop operation is received within the visual representation of the remote computer system.

12. The system of claim 7, wherein:
   the at least one processor is further configured to detect that the drag-and-drop operation was initiated on the remote computer system; and
   the movable cursor is confined after detecting that the drag-and-drop operation was initiated.

13. A non-transitory computer readable medium storing executable sequences of instructions to invoke a host-to-client drag-and-drop operation, the sequences of instructions comprising instructions to:
   render, via a user interface, a first representation of a client computer system and a second representation of a remote computer system distinct from the client computer system;
   receive, via the user interface, input initiating a drag-and-drop operation of a digital resource provided by the remote computer system;

detecting that a cursor effectuating the drag-and-drop operation has left the second representation;
confine the cursor to a portion of the first representation;
after confining the cursor, move a source proxy window to encompass the portion of the first representation;
free the cursor in response to the source proxy window being positioned such that it encompasses a location of the cursor; and
initiate the drag-and-drop operation on the first representation.

14. The non-transitory computer readable medium of claim 13, wherein the cursor is confined using a function that receives display coordinates defining the portion of the first representation and that causes the client computer system to keep the cursor within the portion of the first representation defined by the received display coordinates.

15. The non-transitory computer readable medium of claim 13, wherein the cursor is freed further in response to the source proxy window detecting a simulated mouse event.

16. The non-transitory computer readable medium of claim 13, wherein the cursor is confined using a ClipCursor function of an operating system executing at the client computer system.

17. The non-transitory computer readable medium of claim 13, the sequences of instructions further comprising instructions to:
execute a client virtualization agent that includes a client drag-and-drop agent; and
receive, by the client drag-and-drop agent, from a host drag-and-drop agent instantiated at the remote computer system, an event;
wherein the cursor is confined to the portion of the first representation in response to receiving the event from the host drag-and-drop agent.

18. The non-transitory computer readable medium of claim 13, wherein the source proxy window is established while the cursor remains confined to the portion of the first representation.

19. The non-transitory computer readable medium of claim 13, wherein the source proxy window is not visible within the user interface.

20. The non-transitory computer readable medium of claim 13, wherein the input initiating the drag-and-drop operation is received within the second representation of the remote computer system.

* * * * *